United States Patent
Nitta et al.

(10) Patent No.: US 8,747,056 B2
(45) Date of Patent: Jun. 10, 2014

(54) FAN UNIT

(75) Inventors: Kazuhiro Nitta, Kawasaki (JP); Atsushi Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 525 days.

(21) Appl. No.: 12/775,784

(22) Filed: May 7, 2010

(65) Prior Publication Data

US 2010/0294385 A1 Nov. 25, 2010

(30) Foreign Application Priority Data

May 19, 2009 (JP) ................................. 2009-121431

(51) Int. Cl.
*F01D 17/00* (2006.01)

(52) U.S. Cl.
USPC .......................................... 415/144; 415/201

(58) Field of Classification Search
USPC ............ 415/201, 144, 126, 140, 39; 416/120, 416/124, 125, 128, 130, 140, 142; 165/80.3, 121; 361/695
See application file for complete search history.

(56) References Cited

U.S. PATENT DOCUMENTS

| | | | |
|---|---|---|---|
| 5,559,673 A | 9/1996 | Gagnon et al. | |
| 5,572,403 A * | 11/1996 | Mills | 361/695 |
| 6,031,717 A | 2/2000 | Baddour et al. | |
| 6,151,211 A | 11/2000 | Dayan et al. | |
| 6,502,628 B1 | 1/2003 | Siahpolo et al. | |
| 6,537,019 B1 * | 3/2003 | Dent | 415/61 |
| 6,860,713 B2 * | 3/2005 | Hoover | 415/66 |
| 6,938,683 B2 * | 9/2005 | Lin | 165/121 |
| 6,972,956 B2 * | 12/2005 | Franz et al. | 361/695 |
| 2002/0094280 A1 | 7/2002 | Lin et al. | |
| 2002/0191376 A1 * | 12/2002 | Ota et al. | 361/695 |

FOREIGN PATENT DOCUMENTS

| | | |
|---|---|---|
| JP | 3086497 U | 6/2002 |
| JP | 2002-190685 A | 7/2002 |
| JP | 2004-179186 A | 6/2004 |
| JP | 2007-303432 A | 11/2007 |

OTHER PUBLICATIONS

European Search Report dated Aug. 5, 2010, issued in corresponding European Patent Application No. 10161668.8.

* cited by examiner

*Primary Examiner* — Dwayne J White
(74) *Attorney, Agent, or Firm* — Westerman, Hattori, Daniels & Adrian, LLP (57) ABSTRACT

A fan unit includes a housing having an air inlet and an air outlet; a first fan and second fan mounted in the air inlet and the air outlet respectively and arranged in tandem so as to generate an air flow; a first valve mounted adjacent to the air inlet for allowing air to flow into the housing and preventing air from flowing out of the housing; and a second valve mounted adjacent to the air outlet for allowing air to flow out of the housing and preventing air from flowing into the housing.

3 Claims, 13 Drawing Sheets

FAN UNIT

CROSS-REFERENCE TO RELATED APPLICATIONS

This application is based upon and claims the benefit of priority of the prior Japanese Patent Application No. 2009-121431, filed on May 19, 2009, the entire contents of which are incorporated herein by reference.

FIELD

The embodiments discussed herein are related to a fan unit including a plurality of fans.

BACKGROUND

In an electronic apparatus of the related art such as a server apparatus or a personal computer (PC), a fan (blower) that releases heat outside by sending air into the apparatus is sometimes installed to prevent the internal temperature of the apparatus from being increased by heat generation of a processor or the like.

In recent years, to effectively use the limited installation environment, the size of an air duct provided in the electronic apparatus is sometimes reduced so as to decrease the size of the electronic apparatus, and only a small-sized fan can be installed in an increasing number of cases. Accordingly, to sufficiently cool the interior of the electronic apparatus even when only a small-sized fan can be installed, various measures are adopted, for example, a high air blowing pressure is generated by increasing the rotation speed of the fan, or a plurality of fans are arranged in tiers.

Figure 8A:
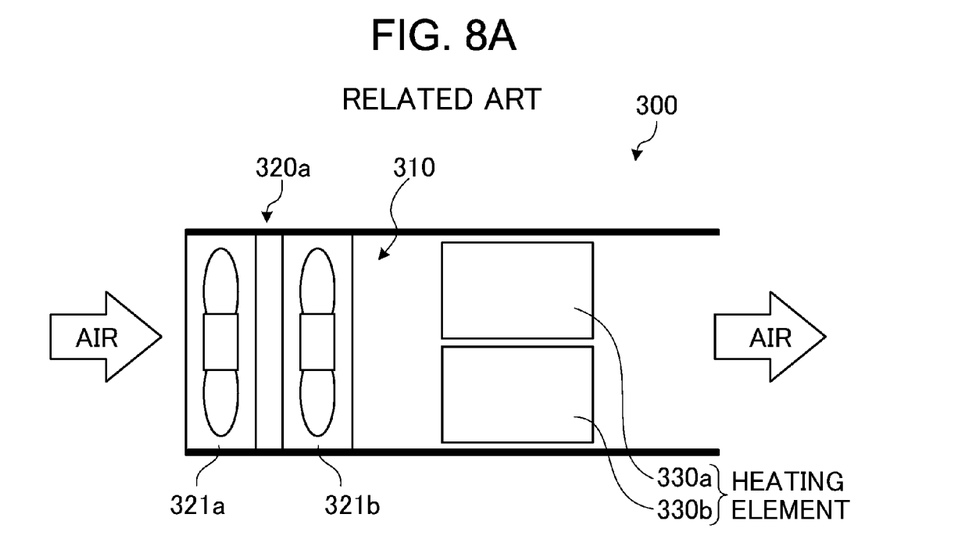
FIG. 8A illustrates an example of an electronic apparatus including two fans arranged in tandem.
Figure 8B:
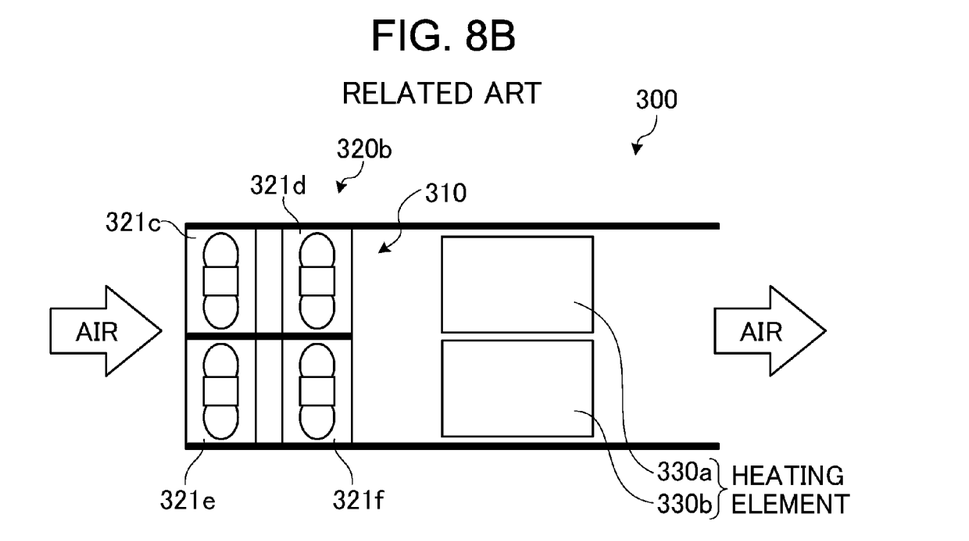
FIG. 8B illustrates an example of an electronic apparatus including four fans arranged in tandem and in parallel.

FIGS. 8A and 8B illustrate cases in which a plurality of fans are arranged in tiers. FIG. 8A illustrates an example of an electronic apparatus in which two fans are arranged in tandem, and FIG. 8B illustrates an example of an electronic apparatus in which four fans are arranged in tandem and in parallel.

Referring to FIG. 8A, a fan unit 320a including two fans 321a and 321b arranged in tandem is provided in an air duct 310 of an electronic apparatus 300. In the electronic apparatus 300, air is blown to heating elements 330a and 330b, such as processors, in the electronic apparatus 300 by rotating the fans 321a and 321b, so that the heating elements 330a and 330b are cooled by the air serving as a refrigerant. In contrast, the electronic apparatus 300 sometimes includes a fan unit 320b in which four fans 321c to 321f are arranged in tandem and in parallel, as illustrated in FIG. 8B.

In this way, even when the air duct is narrow, a sufficient amount of air to cool the heating elements can be obtained by arranging the fans in tiers. Here, of the fans arranged in tiers along the air duct, a fan provided on a side where air is introduced from the outside, for example, the fans 321a, 321c, and 321e, are referred to as a front fan, and a fan provided on a side where the air is blown toward the heating elements 330a and 330b, for example, the fans 321b, 321d, and 321f, is referred to as a rear fan.

In the fan unit including the front fan and the rear fan, if one of the front fan and the rear fan stops because of a breakdown, fans of the faulty fan cause a high airflow resistance, and obstruct air blowing to the heating elements. This may hinder sufficient cooling of the heating elements.

Figure 9A:
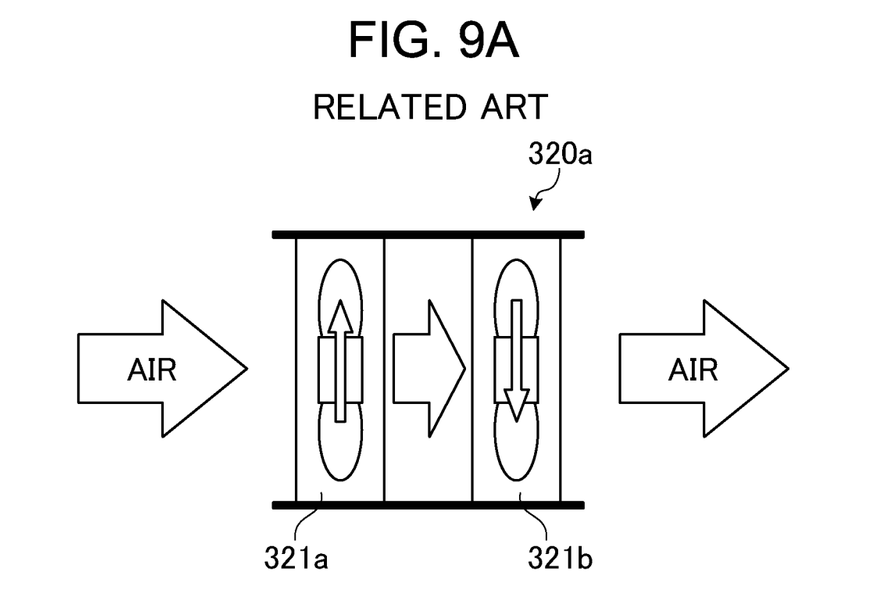
FIG. 9A illustrates an airflow formed when a front fan and a rear fan operate normally.
Figure 9B:
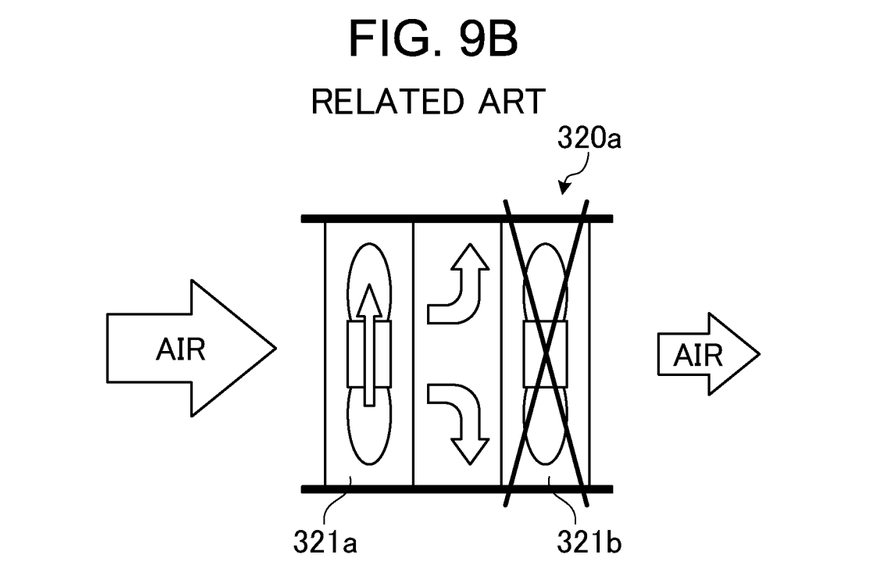
FIG. 9B illustrates an airflow formed when the rear fan stops because of a breakdown.

That is, when the front fan 321a and the rear fan 321b normally operate, an airflow generated by the fan unit 320a is smoothly introduced into the apparatus, as illustrated in FIG. 9A. However, for example, if the rear fan 321b breaks down and stops, as illustrated in FIG. 9B, an airflow generated by the front fan 321a is blocked by the rear fan 321b, and this seriously reduces the amount of air to be introduced into the apparatus.

To cope with such a case, for example, Japanese Registered Utility Model No. 3086497 describes that, when one of the fans breaks down, the pressure of air to be introduced into the apparatus is ensured by increasing the rotation speed of the other fan, thereby reliably cooling the heating elements.

Unfortunately, in the related art, when the rotation speed of the fan is increased, the fan makes more noise.

That is, the fan makes noise (wind noise) due to an eddy of air formed near the fans during operation. Since noise made by operation of the fan increases as the amount of blowing air increases, when the amount of blowing air is increased by increasing the rotation speed of the fan, noise also increases. More specifically, it is said that the amount of noise made by rotation of the fan is proportional to the fifth or sixth power of the rotation speed of the shaft of the fan.

For example, when the rear fan 321b breaks down, as illustrated in FIG. 9B, it is assumed that there is a need to increase the blowing pressure of the front fan 321 by 2.6 times in order to compensate for the air blowing pressure of the rear fan 321b and the loss of blowing pressure of the rear fan 321b due to the airflow resistance. In this case, the rotation speed of the front fan 321a is set to 1.6 times the rotation speed in a normal state. As a result, noise made by rotation of the front fan 321a becomes larger by about 10.5 to 16.8 dB(A) than when the front fan 321a rotates at the normal rotation speed. As for the two fans, that is, the front fan 321a and the rear fan 321b, noise is increased by 7.5 to 13.8 dB(A).

Since noise of the fan increases as the rotation speed of the shaft of the fan increases in this way, when one of the front fan and the rear fan breaks down and the rotation speed of the other normal fan is increased to ensure a sufficient amount of blowing air, a large noise is made. In particular, recent electronic apparatuses have been installed not only in a special place such as a computer room, but also in general offices, and consciousness of noise reduction has been raised. Accordingly, there is a demand to minimize noise of the fan.

SUMMARY

According to an aspect of the invention, a fan unit includes a housing having an air inlet and an air outlet; a first fan and second fan mounted in the air inlet and the air outlet respectively and arranged in tandem so as to generate an air flow; a first valve mounted adjacent to the air inlet for allowing air to flow into the housing and preventing air from flowing out of the housing; and a second valve mounted adjacent to the air outlet for allowing air to flow out of the housing and preventing air from flowing into the housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Fan units (blower units) according to embodiments will be described in detail below with reference to the drawings. It should be noted that the embodiments are not deemed to limit the present invention.

Embodiments

Figure 1:
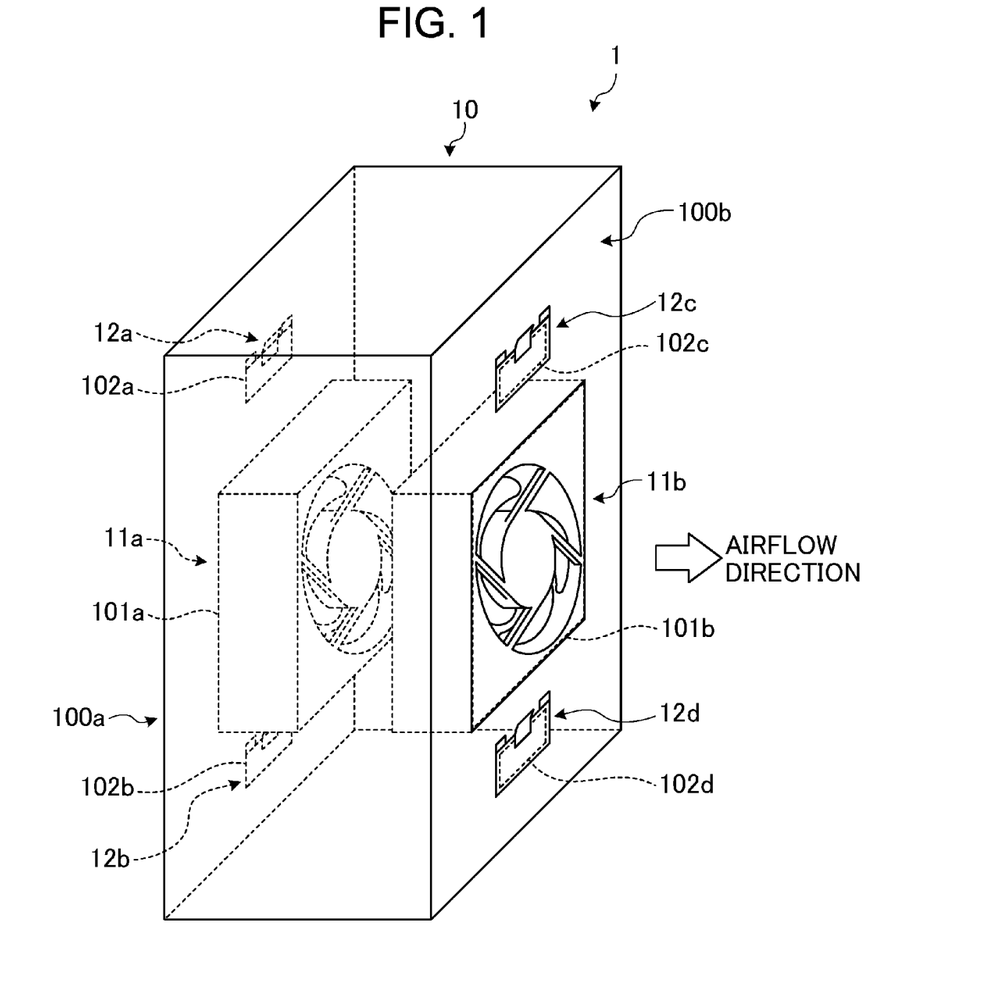
FIG. 1 is a schematic view of a fan unit according to a first embodiment.

FIG. 1 is a schematic view of a fan unit (blower unit) according to a first embodiment. The fan unit of the first embodiment is installed in an air duct provided in an electronic apparatus such as a rack-mountable server apparatus or a general PC, and forcibly cools heating elements, such as processors, provided in the electronic apparatus by blowing air to the heating elements. Referring to FIG. 1, a fan unit 1 of the first embodiment includes a casing 10 (corresponding to the housing) and fans (blowers) 11a and 11b. Hereinafter, a direction (predetermined direction) in which air is blown by the fan unit 1 is referred to as an airflow direction.

The casing 10 is a box-shaped member that houses the fans 11a and 11b. The fans 11a and 11b are respectively mounted on wall portions 100a and 100b orthogonal to the airflow direction, of wall portions that define the casing 10. More specifically, mounting portions 101a and 101b (respectively corresponding to a first air inlet and a first air outlet) formed by apertures of a predetermined shape are provided at the centers of the wall portions 100a and 100b, and the fans 11a and 11b are fitted and fixed in the mounting portions 101a and 101b, respectively.

The fans 11a and 11b cool heating elements in the electronic apparatus by blowing air thereto. In the first embodiment, the fans 11a and 11b are arranged in tandem (in series) in the airflow direction, as illustrated in FIG. 1, and each generate an airflow directed from the fan 11a to the fan 11b. Each of the fans 11a and 11b incorporates a motor (not illustrated) connected to an external power supply. When the motor is rotated by power supplied from the external power supply, blades rotate to produce an airflow.

In this way, the fan unit 1 produces an airflow directed from the fan 11a to the fan 11b by rotating the fans 11a and 11b so that the airflow forcibly cools a heating element (not illustrated) provided on a fan 11b side. For example, if the fan 11b stops because of a breakdown during operation of the fan unit 1, it causes a high airflow resistance and seriously reduces the amount of air to be blown to the heating element. Accordingly, the fan unit 1 of the first embodiment includes vents 102a to 102d provided in the wall portions 100a and 100b, and check valves 12a to 12d that can close the vents 102a to 102d in a direction opposite the airflow direction.

More specifically, the wall portion 100a has the vents 102a and 102b (corresponding to second air inlets) that oppose each other with the fan 11a being disposed therebetween. Similarly, the wall portion 100b has the vents 102c and 102d (corresponding to second air outlets) that oppose each other with the fan 11b being disposed therebetween. Further, the wall portion 100a has the check valves 12a and 12b (corresponding to first valves) for closing the vents 102a and 102b, and the check valves 12a and 12b are provided on a side of the wall portion 100a opposite a side toward which the air flows. Similarly, the wall portion 100b has the check valves 12c and 12d (corresponding to second valves) for closing the vents 102c and 102d, and the check valves 12c and 12d are provided on a side of the wall portion 100b opposite the side toward which the air flows.

For example, when the fan 11b stops, the check valves 12c and 12d are opened by the blowing pressure of an airflow generated by the fan 11a, and let out the airflow from the casing 10 through the vents 102c and 102d. As a result, the fan unit 1 can cool the heating element while suppressing an increase in noise made by the fan 11a.

Figure 2:
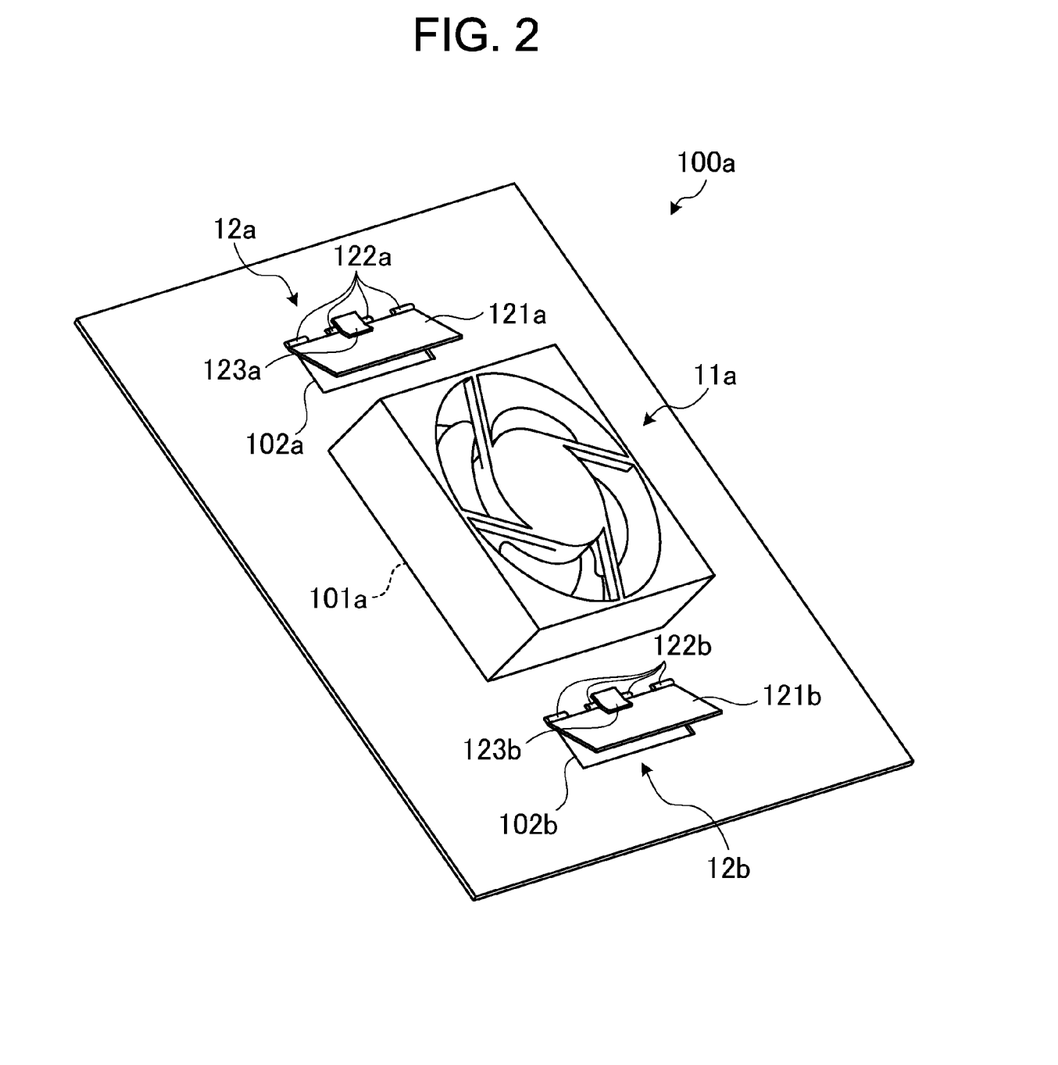
FIG. 2 is a perspective view of a front wall portion and a front fan in the first embodiment.
Figure 3A:
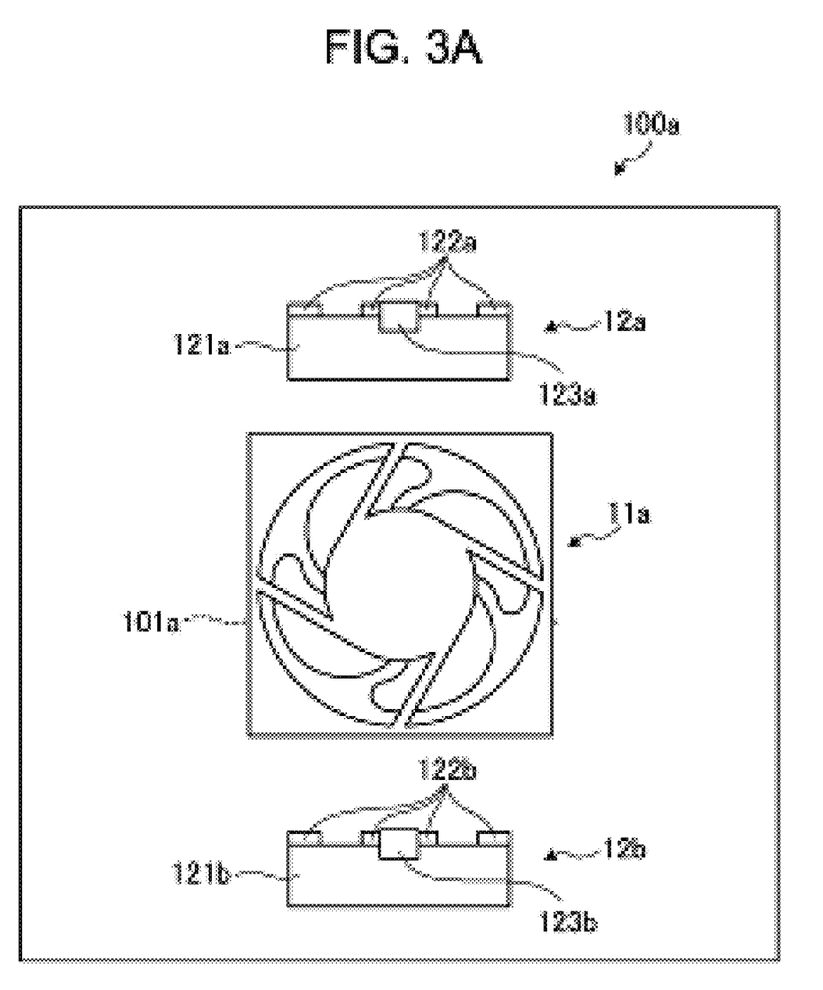
FIG. 3A is a front view of the front wall portion and the front fan in the first embodiment.

Structures of the wall portions 100a and 100b will now be described more specifically. Hereinafter, the fan 11a is referred to as a front fan, and the fan 11b is referred to as a rear fan. Further, the wall portion 100a on which the front fan 11a is mounted is referred to as a front wall portion, and the wall portion 100b on which the rear fan 11b is mounted is referred to as a rear wall portion. FIG. 2 is a perspective view of the front wall portion 100a and the front fan 11a of the first embodiment. FIG. 3A is a front view of the front wall portion 100a and the front fan 11a of the first embodiment, FIG. 3B is a side view of the front wall portion 100a and the front fan 11a in a state in which the check valves are closed, and FIG. 3C is a side view of the front wall portion 100a and the front fan 11a in a state in which the check valves are open.

Referring to FIG. 2, the vents 102a and 102b are rectangular apertures provided in the front wall portion 100a, and oppose each other with the front fan 11a being disposed therebetween. The check valves 12a and 12b for covering the vents 102a and 102b are also provided on the front wall portion 100a. In FIG. 2, a side of the front wall portion 100a where the check valve 12b is provided is a lower side of the front wall portion 100a, and a side where the check valve 12a is provided is an upper side of the front wall portion 100a.

Figure 3B:
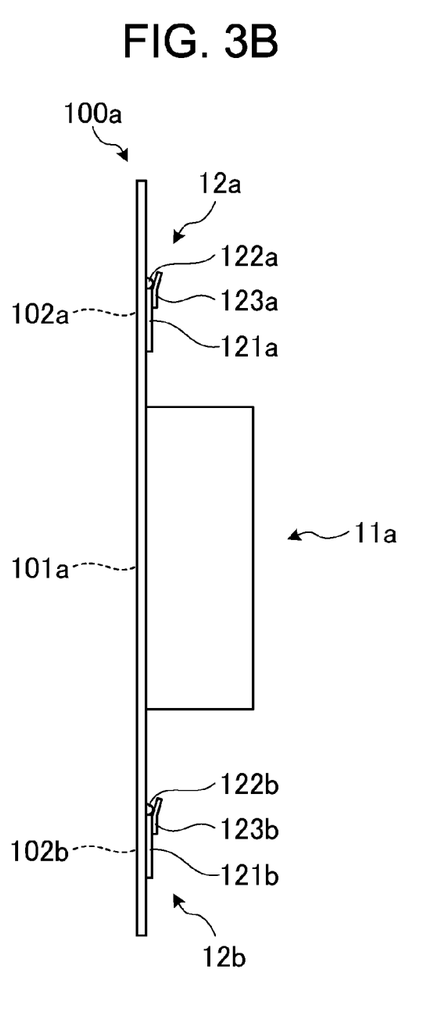
FIG. 3B is a side view of the front wall portion and the front fan in a state in which check valves are closed.
Figure 3C:
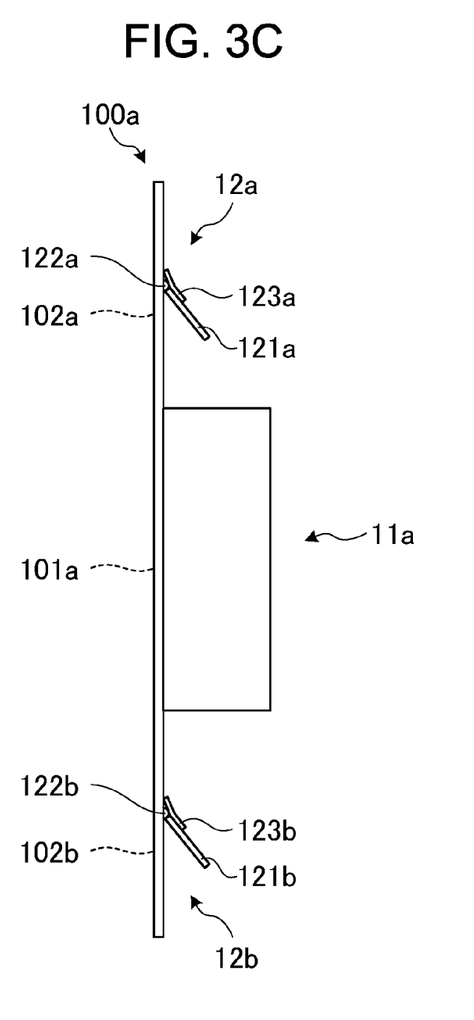
FIG. 3C is a side view of the front wall portion and the front fan in a state in which the check valves are open.

As illustrated in FIGS. 3A and 3B, the check valves 12a and 12b respectively include cover portions 121a and 121b, hinge portions 122a and 122b, and stopper portions 123a and 123b. The cover portions 121a and 121b are formed by flat resin members having a sufficient area to close the vents 102a and 102b. The hinge portions 122a and 122b are attached to upper sides of the vents 102a and 102b, and support the cover portions 121a and 121b in a manner such that the cover portions 121a and 121b can open and close the vents 102a and 102b.

The stopper portions 123a and 123b are locking pieces that are substantially dogleg in side view, and prevent excessive opening of the cover potions 121a and 121b. More specifically, as illustrated in FIG. 3C, when the cover portions 121a and 121b are pivoted open by a predetermined angle on the hinge portions 122a and 122b, the stopper portions 123a and 123b are brought into contact with the front wall portion 100a, thereby preventing the cover portions 121a and 121b from opening by an angle larger than the predetermined angle.

Since the hinge portions 122a and 122b are provided on the upper sides of the vents 102a and 102b, the weights of the cover portions 121a and 121b allow the check valves 12a and 12b to maintain a state in which the vents 102a and 102b are closed by the cover portions 121a and 121b. The structure of the rear wall portion 100b is similar to that of the above-described front wall portion 100a, and therefore, a description thereof is omitted.

Next, the stream of an airflow in the casing 10 that changes according to the operating state of the fan unit 1 will be described specifically. First, a description will be given of shift of the operating state of the fan unit 1 of the first embodiment with reference to FIG. 4.

Figure 4:
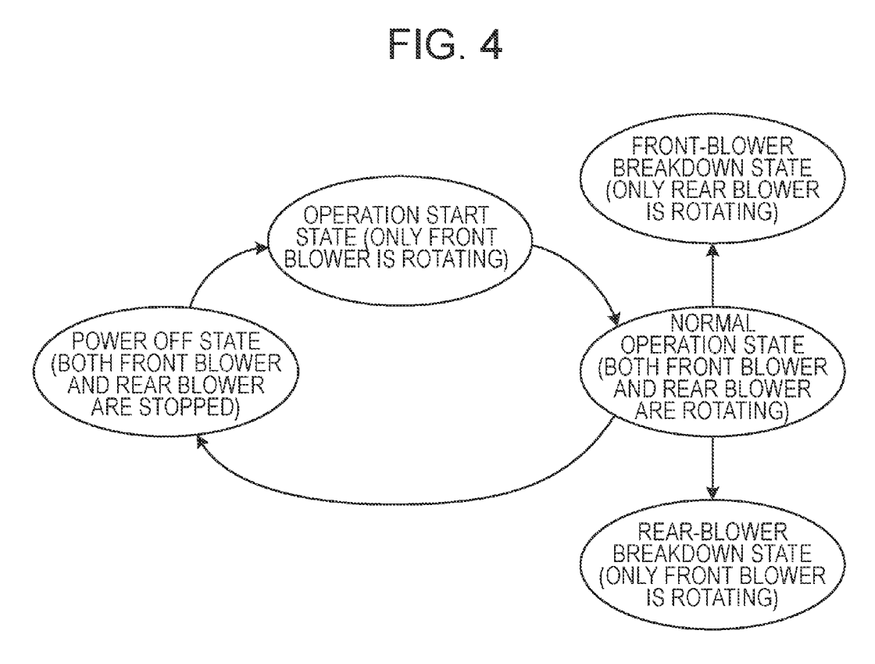
FIG. 4 illustrates transition of an operating state of the fan unit of the embodiment.

Referring to FIG. 4, the operating state of the fan unit 1 shifts in the order of a power off state, an operation start state, a normal operation state, a power off state, etc. In a power off state, no power is supplied from the external power supply, and both the front fan 11a and the rear fan 11b are stopped. In an operation start state, only the front fan 11a is rotating immediately after power-on. In a normal operation state, both the front fan 11a and the rear fan 11b are rotating.

In the first embodiment, the front fan 11a and the rear fan 11b are controlled by a controller (not illustrated) or the like so that workloads thereof are equal. That is, the front fan 11a and the rear fan 11b are controlled so that the volume of air introduced per unit time into the casing 10 by the front fan 11a is equal to the volume air exhausted per unit time from the casing 10 by the rear fan 11b. Hence, when the front fan 11a and the rear fan 11b are normally rotating, air is introduced into and exhausted from the casing 10 only by the front fan 11a and the rear fan 11b.

Figure 5A:
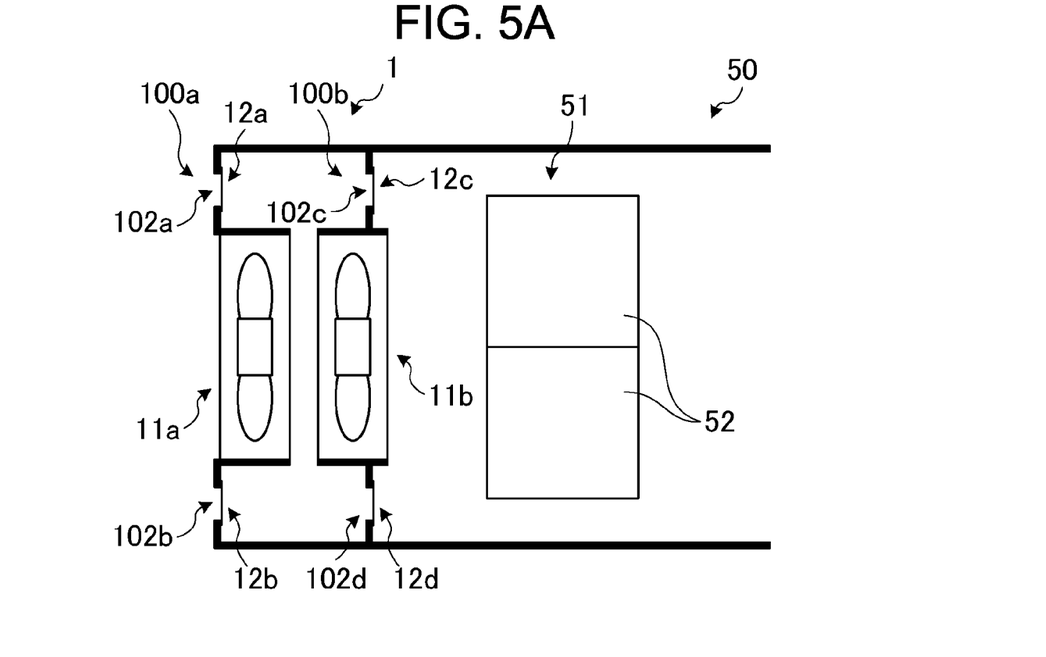
FIG. 5A is a side view illustrating opening/closing states of the check valves before start-up of the fan unit.

Next, a description will be given of the stream of an airflow in a power off state of the fan unit 1. FIG. 5A is a side view illustrating opening/closing states of the check valves 12a to 12d in a power off state of the fan unit 1.

As illustrated in FIG. 5A, the fan unit 1 is provided in an air duct 51 of an electronic apparatus 50. Further, heating elements 52 are set at a position to which an airflow generated by the front fan 11a and the rear fan 11b is blown. In a power off state, none of the front fan 11a and the rear fan 11b are rotating, so that an airflow is not generated.

Figure 5B:
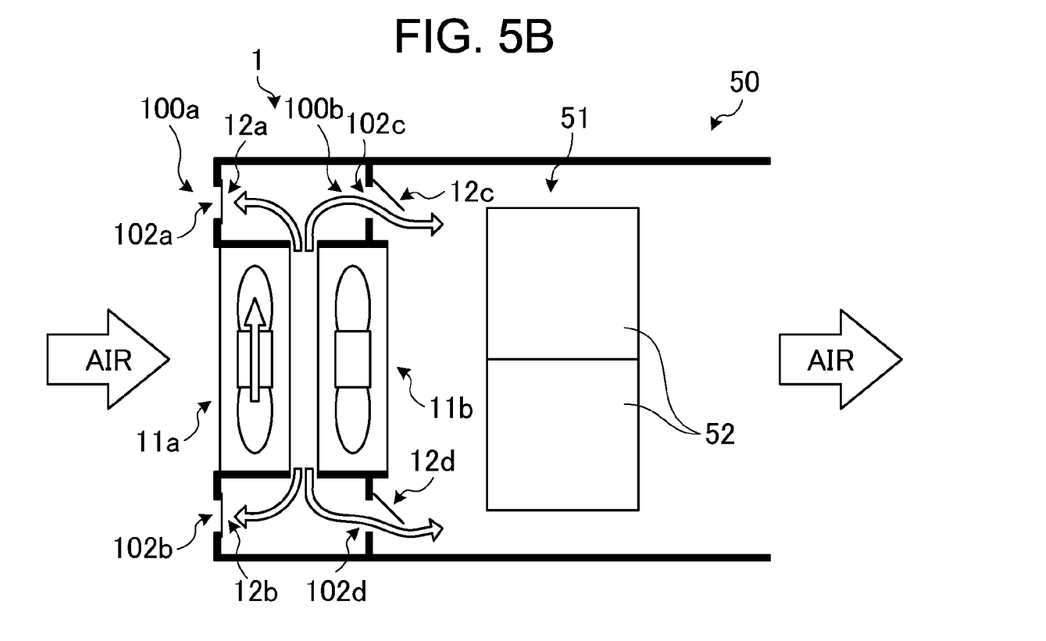
FIG. 5B is a side view illustrating opening/closing states of the check valves when only the front fan starts rotation immediately after start-up of the fan unit.

Subsequently, when the electronic apparatus 50 is powered on, the operating state of the fan unit 1 illustrated in FIG. 4 shifts to an operation start state, where the front fan 11a starts rotation earlier than the rear fan 11b. The stream of an airflow in such a state will be described. FIG. 5B is a side view illustrating opening/closing states of the check valves 12a to 12d when only the front fan 11a starts rotation immediately after start-up of the fan unit 1.

As illustrated in FIG. 5B, when the front fan 11a starts rotation, an airflow is generated by rotation of the front fan 11a, and air is introduced into the casing 10. In this case, the rear fan 11b at a stop causes an airflow resistance and obstructs air blowing. However, the check valves 12c and 12d are opened by the air blowing pressure of the front fan 11a, and the vents 102c and 102d are opened, so that the air is exhausted from the casing 10 through the vents 102c and 102d. Further, since the vents 102a and 102b oppose each other with the front fan 11a being disposed therebetween, the airflow generated by the front fan 11a can be exhausted from the casing 10 in a balanced manner.

Figure 5C:
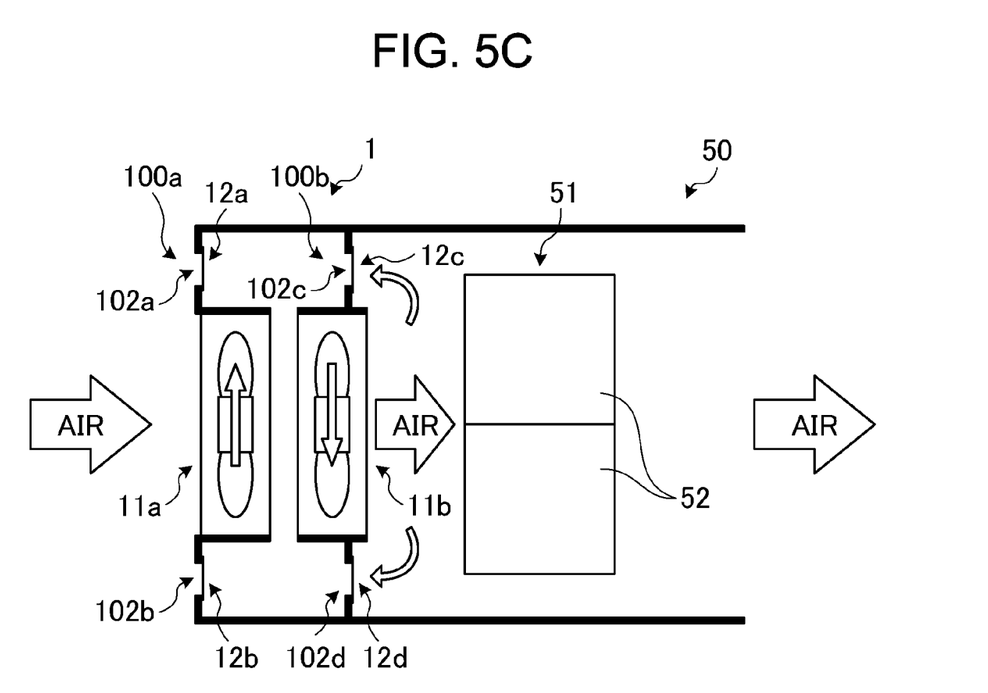
FIG. 5C is a side view illustrating opening/closing states of the check valves when the front fan and a rear fan are rotating normally.

Subsequently, when the rear fan 11b starts rotation and the workload thereof becomes equal to that of the front fan 11a, the operating state of the fan unit 1 illustrated in FIG. 4 shifts to a normal operation state. A description will be given of the stream of an airflow in the normal operation state. FIG. 5C is a side view illustrating opening/closing states of the check valves 12a to 12d when the front fan 11a and the rear fan 11b are rotating normally.

As illustrated in FIG. 5C, when the rear fan 11b starts rotation, an airflow generated by the front fan 11a and the rear fan 11b is exhausted from the casing 10 toward the heating elements 52, and forcibly cools the heating elements 52. When the front fan 11a and rear fan 11b operate with the same workload, the amount of air introduced into the casing 10 and the amount of air exhausted from the casing 10 are equal. For this reason, a pressure is not generated in a direction to open the check valves 12a to 12d. In other words, since the vents 102a to 102d remain closed by the check valves 12a to 12d, air does not flow through the vents 102a to 102d.

In addition, part of the air exhausted from the casing 10 strikes the heating elements 52, thereby returns toward the fan unit 1, and generates a pressure for biasing the check valves 12c and 12d in a closing direction. Thus, the check valves 12c and 12d can more reliably maintain the closing states of the vents 102c and 102d.

While the front fan 11a and the rear fan 11b rotate in opposite directions in the first embodiment, they may rotate in the same direction.

Figure 5D:
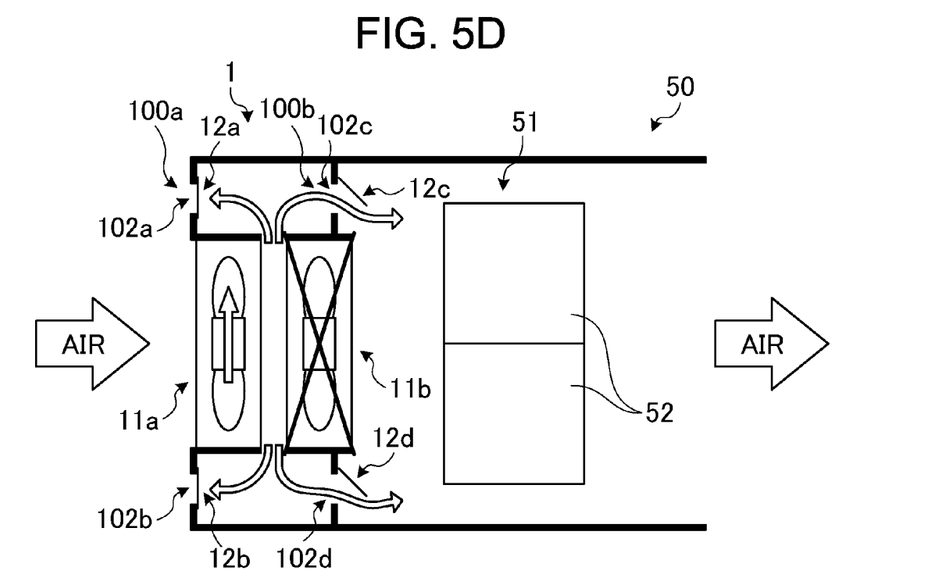
FIG. 5D is a side view illustrating opening/closing states of the check valves when the rear fan stops because of a breakdown.

Subsequently, when the rear fan 11b stops because of a breakdown in the normal operation state, the operating state of the fan unit 1 illustrated in FIG. 4 shifts to a rear-fan breakdown state. A description will be given of the stream of an airflow in the rear-fan breakdown state. FIG. 5D is a side view illustrating opening/closing states of the check valves 12a to 12d when the rear fan 11b stops because of a breakdown.

As illustrated in FIG. 5D, when the rear fan 11b stops because of a breakdown, only the front fan 11a is rotating. This is a state similar to the state illustrated in FIG. 5B. That is, the check valves 12c and 12d are opened by the pressure of air from the front fan 11a, the vents 102c and 102d are opened, and the air is exhausted from the casing 10 through the vents 102c and 102d. As a result, even when the rear fan 11b stops because of a breakdown and causes a high airflow resistance, the heating elements 52 can be cooled by the air exhausted through the vents 102c and 102d.

Figure 5E:
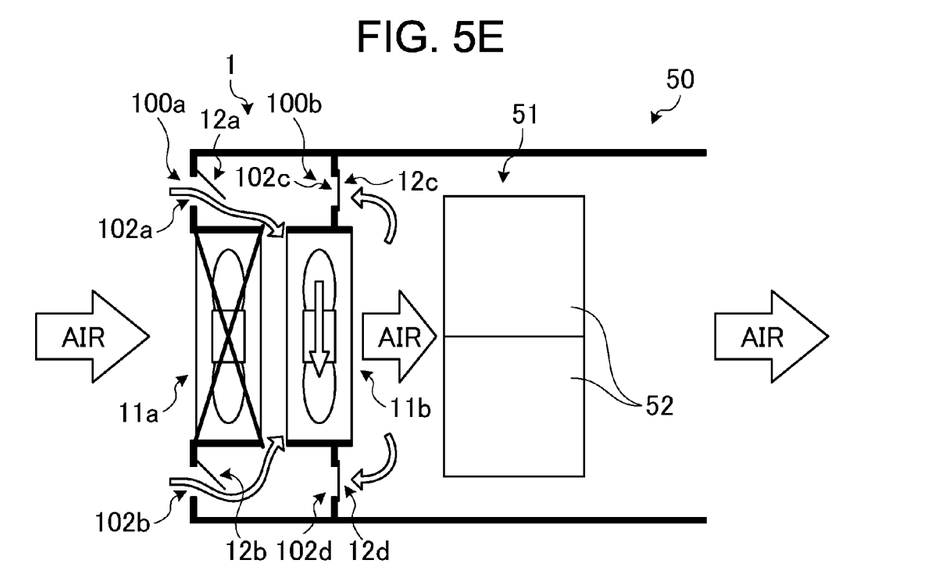
FIG. 5E is a side view illustrating opening/closing states of the check valves when the front fan stops because of a breakdown.

In contrast, when the front fan 11a stops because of a breakdown in the normal operation state, the operating state of the fan unit 1 illustrated in FIG. 4 shifts to a front-fan breakdown state. A description will be given of the stream of an airflow in the front-fan breakdown state. FIG. 5E is a side view illustrating opening/closing states of the check valves 12a to 12d when the front fan 11a stops because of a breakdown.

As illustrated in FIG. 5E, when the front fan 11a stops because of a breakdown, only the rear fan 11b is rotating. In this case, a negative pressure is generated in the casing 10 by rotation of the rear fan 11b, and opens the check valves 12a and 12b, so that the vents 102a and 102b are opened and air is introduced into the casing 10 through the vents 102a and 102b.

As a result, even when the front fan 11a stops because of a breakdown and causes a high airflow resistance, the heating elements 52 can be cooled by air blown through the vents 102c and 102d. In this case, the airflow strikes the heating elements 52, returns toward the fan unit 1, and biases the check valves 12c and 12d in the closing direction. Hence, the check valves 12c and 12d can more reliably maintain the closing state of the vents 102c and 102d.

As described above, in the first embodiment, when one of the fans 11a and 11b that stops because of a breakdown and causes a high airflow resistance, an airflow generated by the other normal fan 11a or 11b is blown to the heating elements 52 through the vents 102a to 102d provided in the wall portions 100a and 100b. For this reason, even if the amount of air to be blown to the heating elements 52 is ensured by increasing the rotation speed of the normal fan 11a or 11b, the heating elements 52 can be cooled while suppressing noise made by the fan unit 1.

In the first embodiment, the wall portions 100a and 100b have the check valves 12a to 12d that can close the vents 102a and 102b and that prevent backflow of air from the vents 102a and 102b. Thus, when both the fans 11a and 11b are rotating, the check valves 12a to 12d close the vents 102a to 102d, so that the entirety of the airflow through the casing 10 is through the fans 11a and 11b. This can prevent the air blowing ability of the fans 11a and 11b from being reduced. Further, when one of the fans 11a and 11b stops because of a breakdown, some of the check valves 12a to 12d provided in the wall portion 100a or 100b having the stopped fan 11a or 11b are opened by the blowing pressure of air from the normal fan 11a or 11b, and the corresponding ones of the vents 102a to 102d are opened. For this reason, the airflow generated by the normal fan 11a or 11b can be blown to the heating elements 52.

Further, since the wall portions 100a and 100b have the stopper portions 123a and 123b for limiting the opening and closing of the check valves 12a to 12d, the check valves 12a to 12d can be prevented from being excessively opened by the blowing pressure of air from the fans 11a and 11b.

In addition, since the air blowing amounts of the fans 11a and 11b are equal, when both the fans 11a and 11b are rotating normally, air does not flow through the vents 102a to 102d. This can prevent the air blowing ability of the fans 11a and 11b from being reduced.

While the first embodiment has been described in detail above with reference to the drawings, it is just illustrative. It is possible to implement the invention not only in the above embodiments, but also in other embodiments applying various modifications and improvements based on the knowledge of those skilled in the art.

Figure 6A:
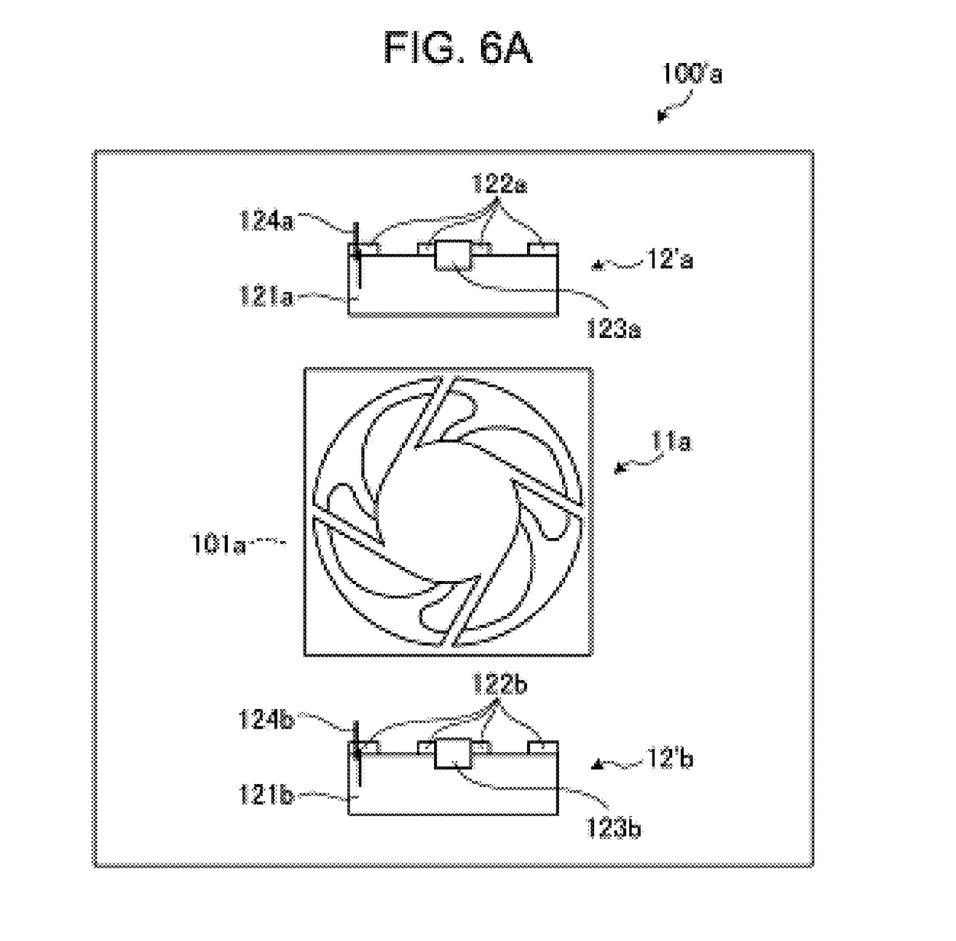
FIG. 6A is a front view of a front wall portion and a front fan according to a second embodiment.

For example, while the check valves 12a to 12d maintain the closing state of the vents 102a to 102d by their own weights in the above-described first embodiment, they may be provided with springs for biasing the check valves 12a to 12d in a direction to close the vents 102a to 102d. FIG. 6A is a front view of a front wall portion 100'a and a front fan 11a according to a second embodiment, and FIG. 6B is a side view of the front wall portion 100'a and the front fan 11a of the second embodiment.

Figure 6B:
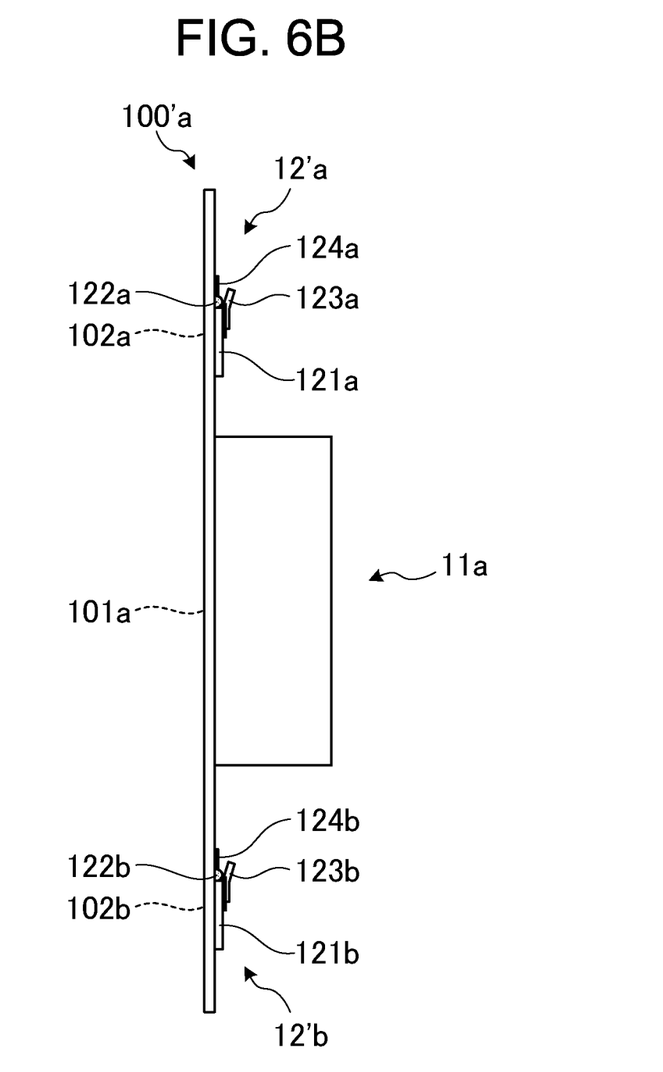
FIG. 6B is a side view of the front wall portion and the front fan in the second embodiment.

More specifically, as illustrated in FIGS. 6A and 6B, check valves 12'a and 12'b provided on the front wall portion 100'a further include springs 124a and 124b for biasing the check valves 12'a and 12'b in a direction to close vents 102a and 102b. The springs 124a and 124b are formed by torsion springs as an example, and are fixed at one end to the front wall portion 100'a and at the other end to cover portions 121a and 121b. The biasing forces of the springs 124a and 124b are set so that the check valves 12'a and 12'b are sufficiently opened by the air blowing pressure of a rear fan 11b.

By thus adding the springs 124a and 124b in the check valves 12'a and 12'b, it is possible to more reliably maintain a state in which the check valves 12'a to 12'b close the vents 102a and 102b. As a result, it is possible to more reliably prevent the air blowing ability of the fans 11a and 11b from being reduced when both the fans 11a and 11b are rotating.

Figure 7:
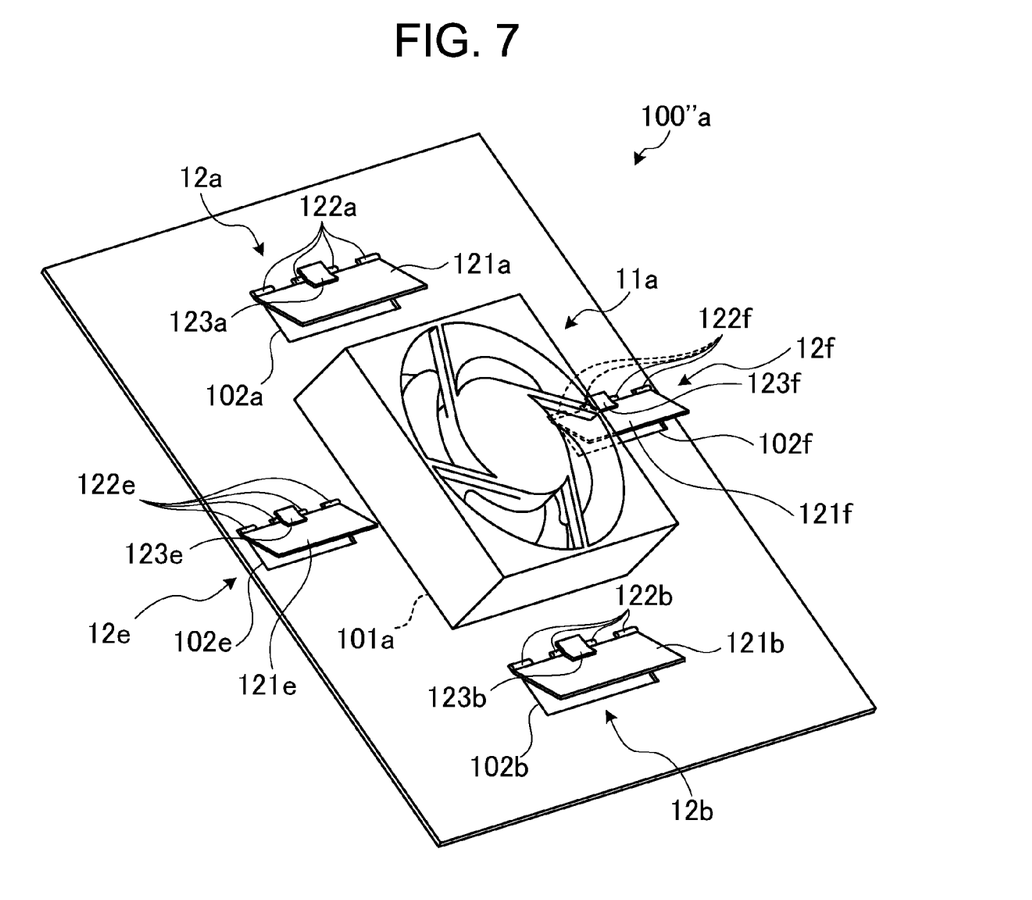
FIG. 7 is a perspective view of a front wall portion and a front fan according to a third embodiment.

While two vents are provided in each of the wall portions 100a and 100b in the above embodiments (vents 102a and 102b and vents 102c and 102d), the number of vents provided in each of the wall portions 100a and 100b is not limited thereto. For example, as illustrated in FIG. 7, a front wall portion 100"a may have four vents 102a, 102b, 102e, and 102f. In this case, the vents 102e and 102f oppose each other with a front fan 11a being disposed therebetween, similarly to the vents 102a and 102b. Further, the front wall portion 100"a further includes a check valve 12e capable of closing the vent 102e and a check valve 12f capable of closing the vent 102f. Structures of the check valves 12e and 12f are the same as those of the check valves 12a and 12b.

While the wall portions 100a and 100b and the fans 11a and 11b are separately provided in the above embodiments, they may be provided integrally. Similarly, the casing 10 and the wall portions 100a and 100b may be provided integrally.

While the front fan 11a starts rotation earlier at power-on of the fan unit 1 in the above embodiments, for example, the rear fan 11b may start rotation earlier, or the front fan 11a and the rear fan 11b may start rotation simultaneously.

While the fan unit 1 is installed in the electronic apparatus 50 so as to forcibly cool the heating elements 52 provided in the electronic apparatus 50 in the above embodiments, the fan unit of the present invention may be installed not only in the electronic apparatus 50, but also in, for example, a refrigerator or an air conditioner.

According to the fan unit of the aspect of the above embodiments, even if any of a plurality of fans breaks down, the heating element can be cooled while suppressing noise made by the fan unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. A fan unit comprising:
a housing having an air inlet and an air outlet;
a first fan and second fan mounted in the air inlet and the air outlet respectively and arranged in tandem so as to generate an air flow;

a first valve mounted adjacent to the air inlet for allowing air to flow into the housing and preventing air from flowing out of the housing; and a second valve mounted adjacent to the air outlet for allowing air to flow out of the housing and preventing air from flowing into the housing;

a first stopper for regulating an opening degree of the first valve; and a second stopper for regulating an opening degree of the second valve; and a first elastic body for biasing the first valve in a direction to close the first valve; and a second elastic body for biasing the second valve in a direction to close the second valve; and a controller that controls the first and second fans such that that the volume of air introduced per unit time into the housing by the front fan is equal to the volume of air exhausted per unit time from the housing by the rear fan.

2. The fan unit according to claim 1, wherein the first valve and the second valve are check valves.

3. The fan unit according to claim 1, wherein the housing having another first valve, and another second valve, the first valve and the another first valve being provided on the both sides of the first fan, the second valve and the another second valve being provided on the both sides of the second fan.

* * * * *